US008000229B2

(12) United States Patent
Witham

(10) Patent No.: US 8,000,229 B2
(45) Date of Patent: Aug. 16, 2011

(54) ALL-TO-ALL INTERCONNECT FABRIC GENERATED MONOTONICALLY INCREASING IDENTIFIER

(75) Inventor: Tim Witham, Aloha, OR (US)

(73) Assignee: Lightfleet Corporation, Vancouver, WA (US)

( * ) Notice: Subject to any disclaimer, the term of this patent is extended or adjusted under 35 U.S.C. 154(b) by 582 days.

(21) Appl. No.: 12/069,432

(22) Filed: Feb. 7, 2008

(65) Prior Publication Data
US 2009/0046716 A1 Feb. 19, 2009

Related U.S. Application Data

(60) Provisional application No. 60/900,152, filed on Feb. 7, 2007.

(51) Int. Cl.
H04L 1/00 (2006.01)
H04L 12/50 (2006.01)

(52) U.S. Cl. ........................................ 370/218; 370/386

(58) Field of Classification Search .................. None
See application file for complete search history.

(56) References Cited

U.S. PATENT DOCUMENTS

| | | | |
|---|---|---|---|
| 3,798,568 A | 3/1974 | Willett | |
| 4,211,834 A | 7/1980 | Lapadula et al. | |
| 4,230,902 A | 10/1980 | Hug et al. | |
| 4,388,720 A | 6/1983 | Silfvast et al. | |
| 4,600,299 A | 7/1986 | Abshire | |
| 5,227,906 A | 7/1993 | Tokumitsu | |
| 5,532,856 A | 7/1996 | Li et al. | |
| 5,541,914 A | 7/1996 | Krishnamoothy et al. | |
| 5,576,873 A | 11/1996 | Crossland et al. | |
| 6,326,600 B1 | 12/2001 | Christensen et al. | |
| 6,414,774 B1 | 7/2002 | Scifres | |
| 6,683,418 B2 | 1/2004 | Shoji et al. | |
| 7,286,719 B2 | 10/2007 | Riley et al. | |
| 7,450,857 B2 | 11/2008 | Dress et al. | |
| 2002/0001127 A1 | 1/2002 | Morishima | |
| 2002/0112139 A1 | 8/2002 | Krause et al. | |
| 2003/0210409 A1 | 11/2003 | Huang et al. | |
| 2005/0138438 A1 | 6/2005 | Bodas | |
| 2007/0097858 A1* | 5/2007 | Lesartre et al. | 370/228 |
| 2007/0186217 A1* | 8/2007 | Murdock et al. | 718/104 |
| 2008/0040523 A1* | 2/2008 | Bruce | 710/110 |
| 2008/0086594 A1* | 4/2008 | Chang et al. | 711/118 |
| 2008/0141092 A1* | 6/2008 | Holt | 714/748 |
| 2008/0228871 A1* | 9/2008 | Sano | 709/203 |
| 2008/0313365 A1* | 12/2008 | Bruce | 710/38 |
| 2009/0070493 A1* | 3/2009 | Riocreux et al. | 710/16 |
| 2009/0106123 A1* | 4/2009 | Foran et al. | 705/26 |

FOREIGN PATENT DOCUMENTS

| | | |
|---|---|---|
| GB | 2404054 | 1/2005 |
| WO | WO 2005/038479 | 4/2005 |

OTHER PUBLICATIONS

Time, Clocks, and the Ordering of Events in a Disturbed System Leslie Lamport, Massachusetts Computer Associates, Inc., Communications of the ACM, Jul. 1978, vol. 21, Nov. 7.

(Continued)

Primary Examiner — Andrew Lee
(74) Attorney, Agent, or Firm — John Bruckner PC

(57) ABSTRACT

Systems and apparatus are described for all-to-all interconnect fabric generated monotonically increasing transaction identifiers. A method includes usage of an all-to-all interconnect fabric generated monotonically increasing transaction identifier to coordinate timing of events on an all-to-all interconnect fabric wherein a) multiple computer elements share the interconnect fabric, b) additional nodes add to total system bandwidth, c) all nodes see all messages from all nodes and any one node can send a message to all nodes with a single command and d) a single failing transmitter effects only the communication of that node.

17 Claims, 3 Drawing Sheets

Host Interface Flow

OTHER PUBLICATIONS

International Search Report for App. No. PCT/US/35242 mailed May 13, 2004.

Cloonan, et al., "Shuffle-Equivalent Interconnection Topologies Based On Computer-Generated Binary-Phase Gratings", Applied Optics, Optical Society of America, Washington, vol. 33, No. 8, Mar. 10, 1994, p. 1405-1430.

McCormick, et al., "Five-Stage Free-Space Optical Switching Network With Field-Effect Transistor Self-Electro-Optic-Effect-Device Smart-Pixel Arrays", Applied Optics, Optical Society of America, Washington, vol. 33, No. 8, Mar. 10, 1994, p. 1601-1618.

* cited by examiner

Student Request Flow

ALL-TO-ALL INTERCONNECT FABRIC GENERATED MONOTONICALLY INCREASING IDENTIFIER

CROSS-REFERENCE TO RELATED APPLICATION

This application claims a benefit of priority under 35 U.S.C. 119(e) from provisional patent application U.S. Ser. No. 60/900,152, filed Feb. 7, 2007, the entire contents of which are hereby expressly incorporated herein by reference for all purposes.

BACKGROUND INFORMATION

1. Field of the Invention

Embodiments of the invention relate generally to the field of computer systems and interconnect fabrics.

2. Discussion of the Related Art

Many computer operations require the knowledge of which operation started or ended before another operation. One way this can be accomplished in a single computer system is by a simple counter in memory that is protected by a lock so that only one process can read and update the counter at a time. By checking the value that a process has received from this counter you can determine by a simple compare when process accessed the counter first.

However in a multi-computer system this can become problematic in that the counter usually is kept in a single system's memory and a request has to go all the way through the interface and operating system in order to request an update.

Another solution to this problem involves specialized hardware that resides on the network and responds with a transaction identifier (TID) when read. The issue with this solution is that the hardware device becomes a single point of failure. So in order to be highly available a secondary device on a different path is required that needs to 1) monitor the traffic to the current master and 2) detect the failure of the primary device. This sort of solution can result in a doubling of the traffic needed to simply satisfy the base requests.

Another method tries to address this problem by placing additional hardware into the controllers that attach to the host. The issue with this solution is that in implementation there needs to be a master and student situation where the students somehow monitor the master and take over in the event of a failure.

SUMMARY OF THE INVENTION

There is a need for the following embodiments of the invention. Of course, the invention is not limited to these embodiments.

According to an embodiment of the invention, a process comprises usage of an interconnect fabric generated monotonically increasing transaction identifier to coordinate timing of events on an interconnect fabric wherein a) multiple computer elements share the interconnect fabric, b) additional nodes add to total system bandwidth, c) all nodes see all messages from all nodes and any one node can send a message to all nodes with a single command and d) a single failing transmitter effects only the communication of that node. According to another embodiment of the invention, a system comprises: an interconnect fabric wherein a) multiple computer elements share the interconnect fabric, b) additional nodes add to total system bandwidth, c) all nodes see all messages from all nodes and any one node can send a message to all nodes with a single command and d) a single failing transmitter effects only the communication of that node; and usage of an interconnect fabric generated monotonically increasing transaction identifier to coordinate timing of events on the interconnect fabric.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The present invention discloses a system and method for using an all-to-all interconnect to generate a unique and increasing over time numerical identifier useful in determining the ordering of events across multiple computing resources. The system and method will function even if the connected entities to the fabric are processing units, storage or I/O devices even if the processing units are running different versions or vendors operating systems.

In general, the context of an embodiment of the invention can include the properties provided by the Lightfleet Warp Fabric Interconnect but can include any fabric interconnect having the following properties. The context of an embodiment of the invention can include Additive bandwidth—As new nodes are added to a system additional bandwidth is created. Normally this would be the properties of a non-blocking switch. The context of an embodiment of the invention can also include All-to-all message delivery—All nodes on the fabric see all messages sent on the fabric. The fabric interface for a single node chooses which messages to process and which to reject. The context of an embodiment of the invention can also include Fault isolation—A failure in the fabric only affects the path of the failing node. Either the transmission path from a single node or the reception of a single node. But it will not be able to clog or overwhelm the fabric paths of any other node.

The invention can use the above properties in order to create a reliable, self healing service that allows cooperating entities on the fabric to share a monotonically increasing number to coordinate the timing of events.

A single node is initially identified as the master node. Only the master node can respond to a host side request for a transaction identifier (TID). In a preferred embodiment, all requests for a TID are initiated by a non-fabric request. The non-fabric request can come from a node that is coupled to the interconnect fabric. For example, a processing unit, a storage unit and/or an input/output unit. In this case, the TID request is considered satisfied when the non-fabric requester has received the TID.

Figure 1:
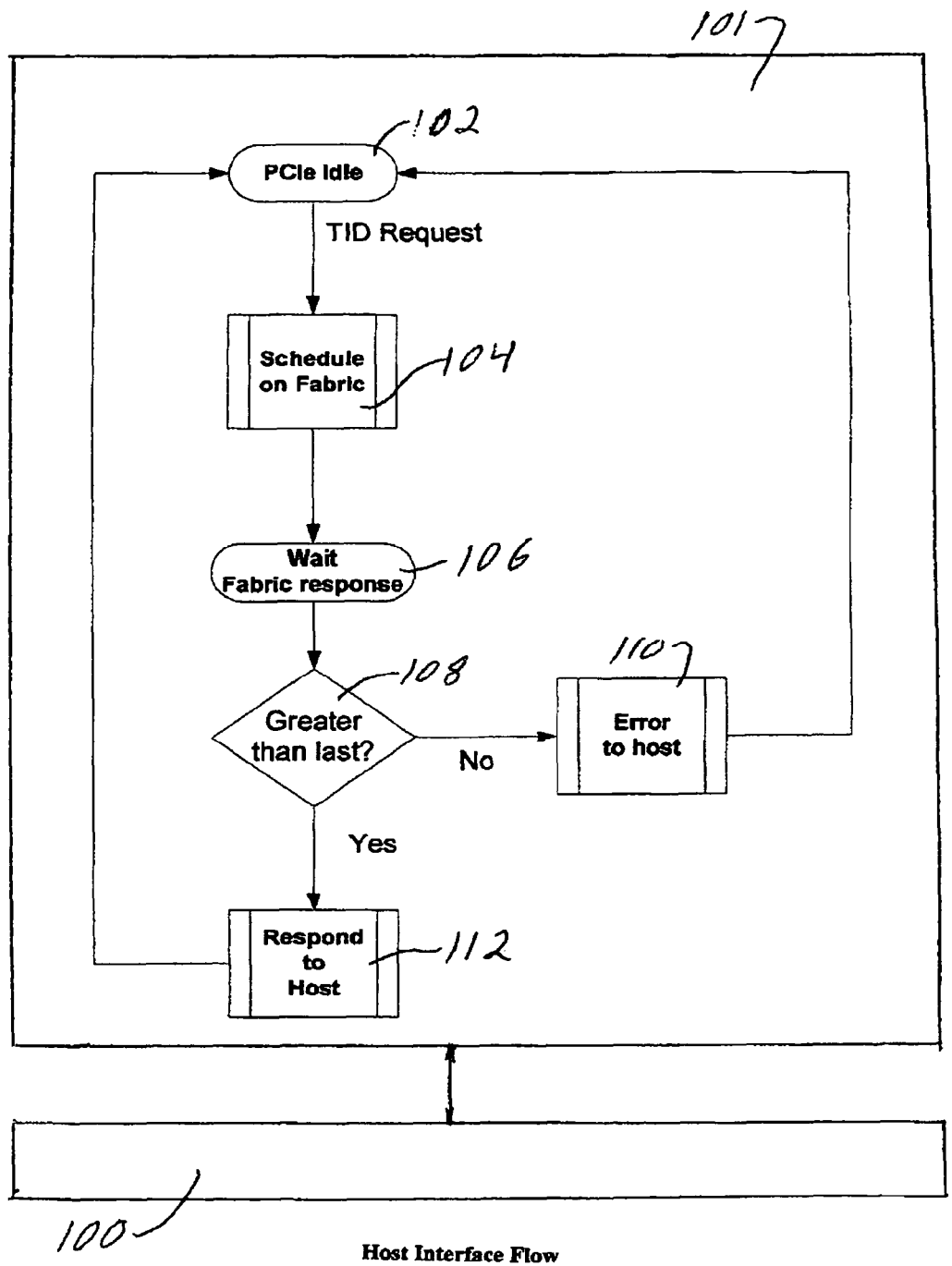
FIG. 1 is a flow diagram of a host interface flow process that can be implemented by a computer program, representing an embodiment of the invention.

Referring to FIG. 1, at block 102, a TID request is transmitted by a host 101 (e.g., node) to an all-to-all interconnect fabric 100. An exemplary TID request will be described in detail with regard to Table 1 below. At block 104 the TID request is scheduled on the interconnect fabric. At block 106, wait for a response. At block 108, it is determined whether the new TID is higher in magnitude that the last TID. If no, at block 110 an error message is sent to the host via the interconnect fabric. If yes, at block 112 the new TID is sent to the host via the interconnect fabric.

Master-Student Relationship

Preferred embodiments of the invention include a student node in addition to the master node. When a student node receives a request from a non-fabric side it 1) blocks the read request until a response with the TID has occurred and 2) sends a packet requesting a TID. A possible version of this packet is described below in Table 1.

TABLE 1

| Header Layout | |
| --- | --- |
| Field | packet |
| 1 | command |
| 2 | Transaction Group ID |
| 3 | Master ID |
| 4 | Requestor ID |
| 5 | Transaction ID |
| 6 | CRC |

The command in Table 1 is a code that indicates that this is a request for a TID and all nodes on the fabric receive and process the request. The master node will be the only node to respond with a generated TID. The other student nodes will monitor the request and response for purposes of error detection and failure recovery.

The Transaction Group ID in Table 1 allows for the fabric to support multiple TIDs on a single fabric. The Master ID in Table 1 can be used to have the master and students check that the student still thinks that the master is in control of the ID or be ignored. The requestor ID in Table 1 is used to allow the master to respond to the requester. The transaction ID in Table 1 does not matter during the request, but is a new TID during the response. The CRC in Table 1 does not matter during the request, but is protection to ensure that the packet is correct during the response.

Figure 2:
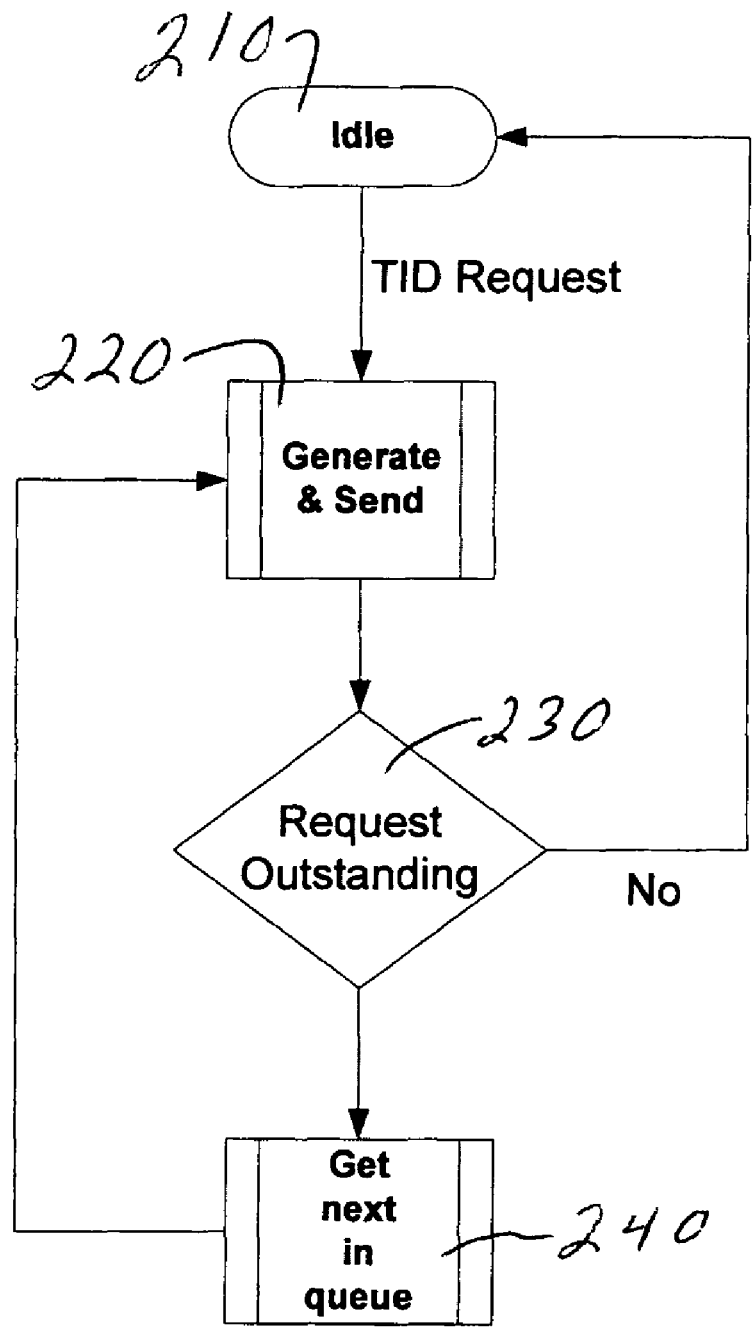
FIG. 2 is a flow diagram of a master response flow process that can be implemented by a computer program, representing an embodiment of the invention.

When the master node receives the request, the master will then respond with a packet formatted in the same manner as above but with a different command specifying that it is a response with a TID. Referring to FIG. 2, at block 210 the master node is idle until the master node receives a TID request from a host node via the interconnect fabric. At block 220, the master node generates the new TID and sends the new TID to the host (requesting) node via the interconnect fabric. Still referring to FIG. 2, at block 230 the master node determines if the is another TID request outstanding (unfulfilled). If no, the master goes idle at block 210. If yes, the master node gets the next request in line at block 240 and generates and sends another TID at block 220 to the requesting node via the interconnect fabric.

Figure 3:
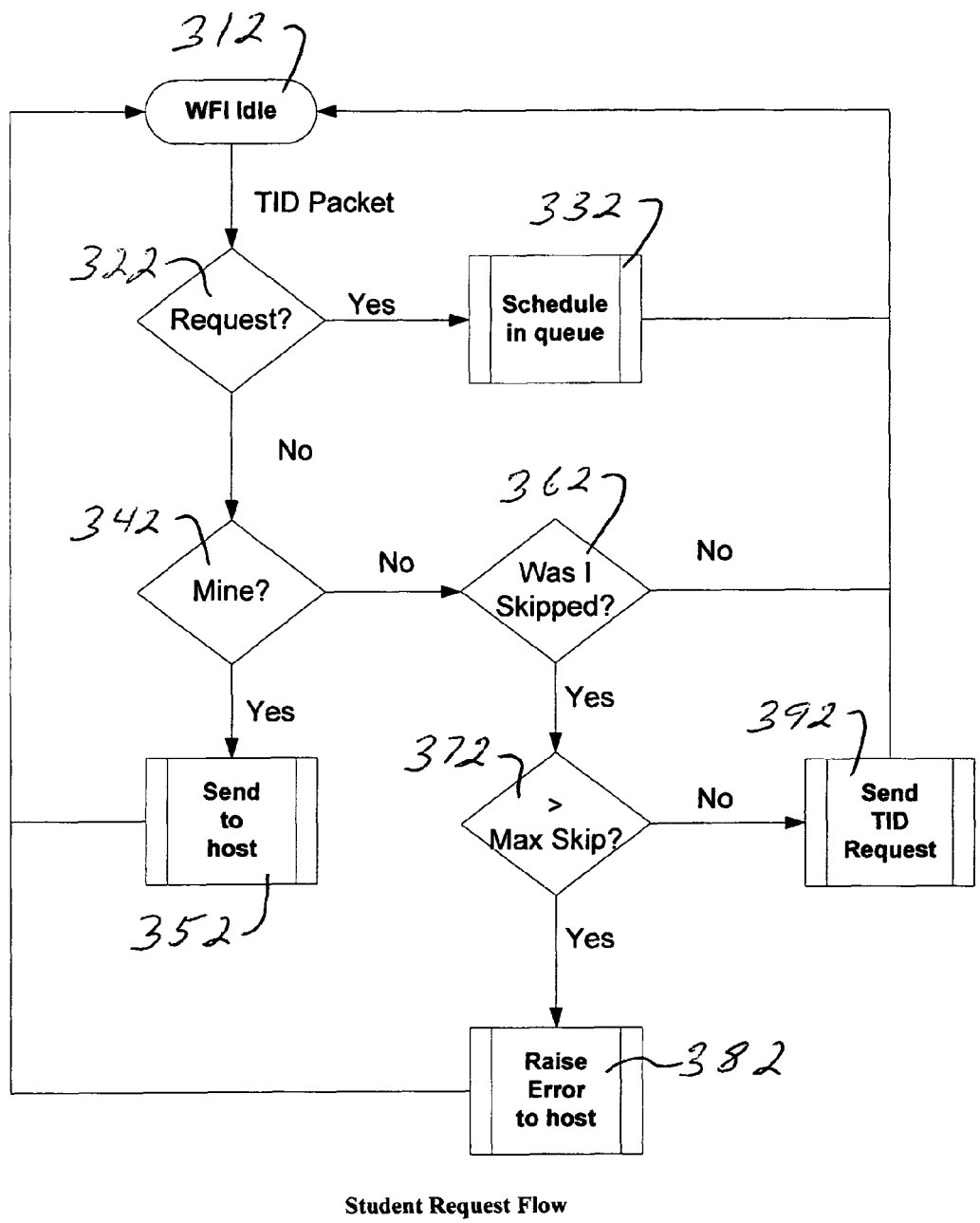
FIG. 3 is a flow diagram of a student request flow process that can be implemented by a computer program, representing an embodiment of the invention.

When the student node receives a packet formatted in the same manner as above, the student node will handle the packet differently depending on whether it is a request or a new TID. Referring to FIG. 3, at block 312, the student node is idle until the student node receives a packet. At block 322, the student determines whether the packet is a request. If yes, the student schedules the request in its queue at block 332 and then goes idle at block 312. If no, the student determines whether the packet is labeled for its reception at block 342. If yes, the student sends the packet to the appropriate host at block 352 and then goes idle at block 312. If no, the student determines whether the student was skipped with respect to a request of its own at block 362. If no, the student goes idle at block 312. If yes, the student determines whether the number of times its has been skipped with respect to the request of its own exceeds a predetermined number of maximum skips at block 372. If yes, the student raises an error to the host at block 382 and then goes idle at block 312. If no, the student optionally sends a TID request at block 392 and then goes idle at block 312.

The invention can include two methods of processing the response which are detailed below as examples. Of course, the invention is not limited to the examples.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of the invention.

Example 1

A fixed master node embodiment will now be described. In a fixed master system the master node is set from the non-fabric side after agreement among the nodes. The master node only changes if there is a failure of the master node and the other nodes agree to select a new master node using an agreed upon method.

In this case the master node responds with a packet as in Table 1 above with the fields having the following meaning listed below in Table 2.

TABLE 2

| Command | Code indicating that this is a response to a TID request |
|---|---|
| Transaction Group ID | Code indicating which TID group is being updated |
| Master ID | ID of the master node responding |
| Requestor ID | Node that will receive the new TID |
| Transaction ID | New transaction ID |
| CRC | Protection to ensure that the packet is correct |

The student response in this fixed master embodiment will now be described. When a student sees this message it response varies depending upon if it was the student being responded to with the new TID or just monitoring the fabric.

If it is the student being responded to it will accept the packet. The acceptance of the packet is dependent upon the packet passing several screens.

Packet is successfully decoded from transmission method and passes CRC verification.

Master ID responding matches local nodes idea of master ID.

Transaction Group ID has an outstanding request for an ID

New transaction ID is larger than the last TID processed on this node.

If the above is true and the end point's ID matches the Requestor ID then the following happens.

Moves current TID to last TID

Sets last node receiving TID to its node

Clears that this node has an outstanding TID request

Allows the read from the non-fabric interface to complete.

If the above is true and the end point's ID does not match the Requestor ID then the following happens.

Checks to see if the end point's ID is between the last Requestor ID cleared and the one just sent. If so it sends another request for a TID unless this would be a preset number times that it has been passed over for a requested TID. If you have exceeded the preset number of missed requests an error will be raised to the non-fabric interface for node to respond to the issue.

Moves current TID to last TID

Sets last node receiving to incoming requestor ID

Clears that requestor ID has an outstanding TID request.

Example 2

A floating master embodiment will now be described. This floating master method differs in that the node that is the master is passed to the student that is receiving the TID. All TID operations result in a message being sent across the fabric even if the master is passing the token to itself. Only the master can pass a TID to the non-fabric side of the interface.

The Master response will now be described. In this case the master node responds with a packet as in Table 1 above with the fields having the following meaning listed below in Table 3.

TABLE 3

| Command | Code indicating that this is a response to a TID request |
|---|---|
| Transaction Group ID | Code indicating which TID group is being updated |
| Master ID | ID of the master node responding |
| Requestor ID | Node that will receive the new TID |
| Transaction ID | New transaction ID |
| CRC | Protection to ensure that the packet is correct |

In this case the request and response packet is exactly the same as the fixed master. Just the response of the master is changed.

The student response will now be described. When a student sees this message its response varies depending upon if it was the student being responded to with the new TID or just monitoring the fabric.

If it is the student being responded to it will accept the packet. The acceptance of the packet is dependent upon the packet passing several screens.

Packet is successfully decoded from transmission method and passes CRC verification.

Master ID responding matches local nodes idea of master ID.

Transaction Group ID has an outstanding request for an ID

New transaction ID is larger than the last TID processed on this node.

If the above is true and the end point's ID matches the Requestor ID then the following happens.

Moves current TID to last TID

Sets last node receiving TID to its node

Clears that this node has an outstanding TID request

Allows the read from the non-fabric interface to complete.

Sets the Master ID to the Requestor ID

If the above is true and the end point's ID does not match the Requestor ID then the following happens.

Checks to see if its ID is between the last Requestor ID cleared and the one just sent. If so it sends another request for a TID unless this would be a preset number times that it has been passed over for a requested TID. If you have exceeded the preset number of missed requests an error will be raised to the non-fabric interface for node to respond to the issue.

Moves current TID to last TID

Sets last node receiving to incoming requestor ID

Clears that requestor ID has an outstanding TID request

Sets the master ID to the requestor ID from the packet

Concurrency

Since a multiple nodes could request a TID before a single TID update operation could be completed, the invention can handle this by logging all requests to a table of outstanding requests. Each node has a slot to indicate its status as to if it has made a request for a TID. All nodes process this table in the same order so they all expect the same node to be given the next TID. The normal operation will result in every node receiving a TID for the student it expected.

However there are several conditions that could result in a node seeing a different result than it expected. This invention detects these instances and is self healing for transitory errors without intervention from the non-fabric side. However critical non-transitory errors are raised to the non-fabric side.

Possible errors include the following. Race conditions—student request passes master response. Corrupted packet—either a decoding error or CRC error causes packet to be discarded by one or more end points.

Race Condition

In the case where the student requests a TID but the master is already in the process of sending a packet to another node that is "past" the student requesting it would result in the request being put into the queue for the next pass through the ordered list.

Failed Packets

A missed packet that results in a master not receiving the request and skipping a node in the list because it was not logged in the table will result in the requesting node seeing that it was skipped. Its normal response is to update a counter to make sure it has not been skipped multiple times (configurable) and send its request again. If the condition goes beyond a set maximum number of requests then an error is raised to its non-fabric interface.

Timing and Performance

Timing and performance calculation results are shown below in Table 4. The following are some assumptions to do the calculations:

8b/10b encoding with a raw speed of 3.125 GHz
All fields are 16 bits except for the CRC and the TID
Interface processing time is 75 nanoseconds
Non-fabric interface time is 200 nanoseconds These assumptions result in the interconnect fabric being able to satisfy over 6.5 million transaction ID requests per second.

TABLE 4

|     | | | | |
| --- | --- | --- | --- | --- |
|     | TID Packet Size | 20 | | |
|     | max TID's per second | 6,596,306 | | |
|     | Encoding | 10 | bits per byte | |
|     |          | 230 | bits to send | |
|     | Clock Speed | 3.1 | GHz | |
|     | serialize | 73.6 | nanoseconds | |
|     | de-serialize | 73.6 | nanoseconds | |
|     | Flight time | 3 | nanoseconds | |
|     | Host to WPC | 250 | nanoseconds | |
|     | WPC to Host | 250 | nanoseconds | |
|     | Processing time | 75 | nanoseconds | |
|     | Local request | | | |
|     | HBA to NIC | 250 | | |
|     | Processing time | 75 | | |
|     | WPC to Host | 250 | | |
|     | ETA | 575 | | |
|     | Remote request (1st) | | | |
|     | Host to WPC | 250 | | |
|     | Processing time | 75 | | |
|     | serialize | 73.6 | | |
|     | Flight time | 3 | | |
|     | de-serialize | 0 | | |
|     | Processing time | 75 | | |
|     | serialize | 73.6 | | |
|     | de-serialize | 0 | Launch Next | |
|     | Processing time | 75 | 625.2 | |
|     | WPC to Host | 250 | | |
|     | ETA 1st TxID | 875.2 | | |
| 2nd | serialize | 73.6 | | |
|     | Flight time | 3 | | |
|     | de-serialize | 0 | Launch Next | |
|     | Processing time | 75 | 776.8 | |
|     | WPC to Host | 250 | Difference | |
|     | ETA 2nd | 1026.8 | 151.6 | |
|     | diff to second | 151.6 | | |
| 3rd | serialize | 73.6 | | |
|     | Flight time | 3 | | |
|     | de-serialize | 0 | | |
|     | Processing time | 75 | | |
|     | WPC to Host | 250 | | |

TABLE 4-continued

| | |
| --- | --- |
| ETA 3rd | 1178.4 |
| diff to third | 151.6 |

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences.

Various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising
   generating a monotonically increasing transaction identifier with an all-to-all interconnect fabric; and
   using the monotonically increasing transaction identifier with a host to coordinate timing of events on the all-to-all interconnect fabric,
   wherein a) multiple computer elements share the interconnect fabric, b) additional hosts add to total system bandwidth, c) all hosts see all messages from all hosts and any one host can send a message to all hosts with a single command and d) a single failing transmitter effects only the communication of that host.

2. The method of claim 1, wherein using includes a common usage of the monotonically increasing transaction identifier.

3. The method of claim 1, wherein using includes different usage models of the monotonically increasing transaction identifier.

4. The method of claim 1, wherein multiple computer elements share the all-to-all interconnect fabric with a single version of an operating system.

5. The method of claim 1, wherein multiple computer elements share the all-to-all interconnect fabric with multiple versions of an operating system.

6. The method of claim 1, wherein multiple computer elements share the all-to-all interconnect fabric with operating systems from multiple vendors.

7. The method of claim 1, wherein multiple computer elements include members selected from computer systems, network controllers and storage controllers.

8. The method of claim 1, further comprising using a plurality of interconnect fabric generated monotonically increasing transaction identifiers.

9. A system, comprising:
   an all-to-all interconnect fabric wherein a) multiple computer elements share the all-to-all interconnect fabric, b) additional hosts add to total system bandwidth, c) all hosts see all messages from all hosts and any one host can send a message to all hosts with a single command and d) a single failing transmitter effects only the communication of that host; and
   a host that uses an all-to-all interconnect fabric generated monotonically increasing transaction identifier to coordinate timing of events on the all-to-all interconnect fabric.

10. The system of claim 9, wherein usage includes a common usage of the all-to-all interconnect fabric generated monotonically increasing transaction identifier.

11. The system of claim 9, wherein usage includes different usage models of the all-to-all interconnect fabric generated monotonically increasing transaction identifier.

12. The system of claim 9, wherein multiple computer elements share the all-to-all interconnect fabric with a single version of an operating system.

13. The system of claim 9, wherein multiple computer elements share the all-to-all interconnect fabric with multiple versions of an operating system.

14. The system of claim 9, wherein multiple computer elements share the all-to-all interconnect fabric with operating systems from multiple vendors.

15. The method of claim 1, wherein multiple computer elements include members selected from computer systems, network controllers and storage controllers.

16. The method of claim 1, further comprising usage of a plurality of all-to-all interconnect fabric generated monotonically increasing transaction identifiers.

17. An electronic medium, comprising computer or machine readable program elements translatable for implementing a method including: generating a monotonically increasing transaction identifier with an all-to-all interconnect fabric; and using the monotonically increasing transaction identifier with a host to coordinate timing of events on the all-to-all interconnect fabric wherein a) multiple computer elements share the all-to-all interconnect fabric, b) additional hosts add to total system bandwidth, c) all hosts see all messages from all hosts and any one host can send a message to all hosts with a single command and d) a single failing transmitter effects only the communication of that host.

* * * * *